(12) United States Patent
Fredericks et al.

(10) Patent No.: US 8,712,811 B2
(45) Date of Patent: Apr. 29, 2014

(54) METHOD AND SYSTEMS FOR DETECTING DUPLICATE TRAVEL PATH

(75) Inventors: Michael Fredericks, Fairfax, VA (US);
Keith Moffatt, Newcastle, WA (US);
Brian Jeffrey Ollenberger, Brentwood, CA (US); Lisa Anne Silveria, San Francisco, CA (US); Richard Thor Denmark, San Francisco, CA (US); Michael Lore, Vienna, VA (US)

(73) Assignee: Concur Technologies, Inc., Redmond, WA (US)

( * ) Notice: Subject to any disclaimer, the term of this patent is extended or adjusted under 35 U.S.C. 154(b) by 0 days.

(21) Appl. No.: 13/602,589

(22) Filed: Sep. 4, 2012

(65) Prior Publication Data
US 2012/0330906 A1    Dec. 27, 2012

Related U.S. Application Data

(63) Continuation-in-part of application No. 13/593,108, filed on Aug. 23, 2012, which is a continuation-in-part of application No. 13/277,923, filed on Oct. 20, 2011, now Pat. No. 8,620,750, application No. 13/602,589, which is a continuation-in-part of application No. 13/277,916, filed on Oct. 20, 2011, application No. 13/602,589, which is a continuation-in-part of application No. 12/901,947, filed on Oct. 11, 2010, application No. 13/602,589, which is a continuation-in-part of application No. 12/773,282, filed on May 4, 2010, application No. 13/602,589, which is a continuation-in-part of application No. 11/763,562, filed on Jun. 15, 2007, which is a continuation of application No. 10/270,672, filed on Oct. 16, 2002, now abandoned, application No. 13/602,589, which is a continuation-in-part of application No. 13/396,255, filed on Feb. 14, 2012, which is a continuation of application No. 12/755,127, filed on Apr. 6, 2010, now Pat. No. 8,140,361, which is a continuation of application No. 10/373,096, filed on Feb. 26, 2003, now Pat. No. 7,720,702, application No. 13/602,589, which is a continuation-in-part of application No. 13/117,303, filed on May 27, 2011, which is a continuation of application No. 11/159,398, filed on Jun. 23, 2005, now Pat. No. 7,974,892.

(60) Provisional application No. 61/569,942, filed on Dec. 13, 2011, provisional application No. 61/569,949, filed on Dec. 13, 2011, provisional application No. 61/529,680, filed on Aug. 31, 2011, provisional application No. 61/405,480, filed on Oct. 21, 2010, provisional application No. 61/405,488, filed on Oct. 21, 2010, provisional application No. 61/324,533, filed on Apr. 15, 2010, provisional application No. 60/329,281, filed on Oct. 16, 2001, provisional application No. 60/581,766, filed on Jun. 23, 2004.

(51) Int. Cl.
*G06Q 10/00*    (2012.01)

(52) U.S. Cl.
USPC ......................................................... 705/6

(58) Field of Classification Search
USPC ..................................................... 705/5, 6
See application file for complete search history.

(56) References Cited

U.S. PATENT DOCUMENTS

| 5,191,523 A | 3/1993 | Whitesage |
| 5,570,283 A | 10/1996 | Shoolery et al. |

(Continued)

OTHER PUBLICATIONS

File History of U.S. Appl. No. 12/773,282.

(Continued)

*Primary Examiner* — Shannon Campbell
(74) *Attorney, Agent, or Firm* — DLA Piper LLP US

(57) ABSTRACT

A system and method comprising: receiving itinerary data from at least two sources; identifying a traveler associated with the itinerary data; and adding information about the identified traveler to the itinerary data.

16 Claims, 5 Drawing Sheets

(56) References Cited

U.S. PATENT DOCUMENTS

| | | | |
|---|---|---|---|
| 5,644,721 A | 7/1997 | Chung et al. | |
| 5,648,900 A | 7/1997 | Bowen et al. | |
| 5,739,512 A | 4/1998 | Tognazzini | |
| 5,802,492 A | 9/1998 | DeLorme et al. | |
| 5,802,511 A | 9/1998 | Kouchi et al. | |
| 5,832,451 A | 11/1998 | Flake et al. | |
| 5,832,454 A | 11/1998 | Jafri et al. | |
| 5,899,981 A * | 5/1999 | Taylor et al. | 705/30 |
| 5,948,040 A | 9/1999 | Delorme et al. | |
| 6,009,408 A * | 12/1999 | Buchanan | 705/5 |
| 6,023,679 A | 2/2000 | Acebo et al. | |
| 6,029,144 A * | 2/2000 | Barrett et al. | 705/30 |
| 6,115,680 A | 9/2000 | Coffee et al. | |
| 6,307,572 B1 | 10/2001 | Demarcken et al. | |
| 6,360,205 B1 | 3/2002 | Iyengar et al. | |
| 6,442,526 B1 * | 8/2002 | Vance et al. | 705/5 |
| 6,446,048 B1 | 9/2002 | Wells et al. | |
| 6,801,226 B1 | 10/2004 | Daughtrey | |
| 6,826,473 B1 | 11/2004 | Burch et al. | |
| 6,847,824 B1 | 1/2005 | Contractor | |
| 7,050,986 B1 | 5/2006 | Vance et al. | |
| 7,103,558 B1 | 9/2006 | Patton et al. | |
| 7,158,980 B2 | 1/2007 | Shen | |
| 7,194,417 B1 | 3/2007 | Jones | |
| 7,249,041 B2 | 7/2007 | Last | |
| 7,263,664 B1 | 8/2007 | Daughtrey | |
| 7,277,923 B2 | 10/2007 | Rensin et al. | |
| 7,343,295 B2 | 3/2008 | Pomerance | |
| 7,349,894 B2 | 3/2008 | Barth et al. | |
| 7,366,682 B1 | 4/2008 | Katiyar et al. | |
| 7,395,231 B2 | 7/2008 | Steury et al. | |
| 7,409,643 B2 | 8/2008 | Daughtrey | |
| 7,483,883 B2 | 1/2009 | Barth et al. | |
| 7,493,261 B2 | 2/2009 | Chen et al. | |
| 7,502,746 B2 | 3/2009 | Bertram et al. | |
| 7,516,089 B1 | 4/2009 | Walker et al. | |
| 7,539,620 B2 | 5/2009 | Winterton et al. | |
| 7,548,615 B2 | 6/2009 | Bhalgat et al. | |
| 7,949,579 B2 | 5/2011 | Keld | |
| 8,195,194 B1 | 6/2012 | Tseng | |
| 8,224,830 B2 * | 7/2012 | Bidlack | 707/758 |
| 8,271,337 B1 | 9/2012 | Norins | |
| 2001/0042032 A1 | 11/2001 | Crawshaw et al. | |
| 2001/0051911 A1 | 12/2001 | Marks et al. | |
| 2001/0053999 A1 | 12/2001 | Feinberg | |
| 2002/0026416 A1 | 2/2002 | Provinse | |
| 2002/0042715 A1 | 4/2002 | Kelley | |
| 2002/0065688 A1 | 5/2002 | Charlton et al. | |
| 2002/0077871 A1 | 6/2002 | Udelhoven et al. | |
| 2002/0095256 A1 | 7/2002 | Jones et al. | |
| 2002/0100803 A1 | 8/2002 | Sehr | |
| 2002/0124067 A1 | 9/2002 | Parupudi et al. | |
| 2002/0128971 A1 | 9/2002 | Narasimhan | |
| 2002/0152100 A1 | 10/2002 | Chen et al. | |
| 2002/0152101 A1 | 10/2002 | Lawson et al. | |
| 2002/0173978 A1 | 11/2002 | Boies et al. | |
| 2003/0036918 A1 | 2/2003 | Pintsov | |
| 2003/0040987 A1 | 2/2003 | Hudson et al. | |
| 2003/0046195 A1 | 3/2003 | Mao | |
| 2003/0065805 A1 | 4/2003 | Barnes, Jr. | |
| 2003/0088487 A1 * | 5/2003 | Cheng et al. | 705/30 |
| 2003/0115141 A1 | 6/2003 | Felix et al. | |
| 2003/0120526 A1 | 6/2003 | Altman et al. | |
| 2003/0141411 A1 | 7/2003 | Pandya | |
| 2003/0171990 A1 | 9/2003 | Rao et al. | |
| 2003/0187705 A1 | 10/2003 | Schiff | |
| 2003/0225600 A1 | 12/2003 | Slivka et al. | |
| 2004/0002876 A1 | 1/2004 | Sommers et al. | |
| 2004/0044674 A1 | 3/2004 | Mohammadioun et al. | |
| 2004/0083134 A1 | 4/2004 | Spero et al. | |
| 2004/0167808 A1 | 8/2004 | Fredericks et al. | |
| 2004/0193457 A1 * | 9/2004 | Shogren | 705/5 |
| 2004/0210497 A1 | 10/2004 | Hirayama et al. | |
| 2004/0215566 A1 | 10/2004 | Meurer | |
| 2004/0243489 A1 | 12/2004 | Mitchell et al. | |
| 2004/0267555 A1 | 12/2004 | Dale | |
| 2005/0015272 A1 * | 1/2005 | Wind et al. | 705/1 |
| 2005/0033668 A1 | 2/2005 | Garcia et al. | |
| 2005/0108068 A1 | 5/2005 | Marcken et al. | |
| 2005/0108117 A1 | 5/2005 | Newman | |
| 2005/0165680 A1 | 7/2005 | Keeling et al. | |
| 2005/0203760 A1 | 9/2005 | Gottumukkala et al. | |
| 2005/0222854 A1 | 10/2005 | Dale et al. | |
| 2005/0222944 A1 | 10/2005 | Dodson, Jr. et al. | |
| 2005/0251430 A1 | 11/2005 | Jindel | |
| 2005/0267787 A1 | 12/2005 | Rose | |
| 2005/0288973 A1 | 12/2005 | Taylor et al. | |
| 2006/0053053 A1 | 3/2006 | Baggett | |
| 2006/0106655 A1 | 5/2006 | Lettovsky et al. | |
| 2006/0212321 A1 | 9/2006 | Vance et al. | |
| 2006/0247993 A1 | 11/2006 | Scanlan et al. | |
| 2006/0277079 A1 | 12/2006 | Gilligan et al. | |
| 2006/0287880 A1 | 12/2006 | Fitzgerald et al. | |
| 2007/0067193 A1 | 3/2007 | Robertson | |
| 2007/0094056 A1 | 4/2007 | Kang et al. | |
| 2007/0143155 A1 | 6/2007 | Whitsett et al. | |
| 2008/0072067 A1 | 3/2008 | Koretz | |
| 2008/0086455 A1 | 4/2008 | Meisels et al. | |
| 2008/0167887 A1 | 7/2008 | Marcken | |
| 2008/0319808 A1 | 12/2008 | Wofford et al. | |
| 2009/0012824 A1 * | 1/2009 | Brockway et al. | 705/6 |
| 2009/0099965 A1 | 4/2009 | Grant | |
| 2009/0125321 A1 | 5/2009 | Charlebois et al. | |
| 2009/0210262 A1 | 8/2009 | Rines | |
| 2009/0216746 A1 | 8/2009 | Aubin et al. | |
| 2009/0271302 A1 * | 10/2009 | Hamper | 705/30 |
| 2010/0228628 A1 | 9/2010 | Dufour | |
| 2011/0029413 A1 | 2/2011 | Ben-Tzur et al. | |
| 2011/0282964 A1 | 11/2011 | Krishnaswamy | |
| 2011/0307280 A1 | 12/2011 | Mandelbaum | |
| 2012/0281584 A1 | 11/2012 | Powers | |

OTHER PUBLICATIONS

File History of U.S. Appl. No. 13/380,319.
PR Newswire, Concur Technologies Launches Concur Expense 7.0, Jul. 24, 2003, p. 1.
"Gelco Information", Business Wire, Mar. 17, 1998.
"American Express Announces New Features in the latest Release of AXI(SM) at Corporate Travel World", PR Newswire, Mar. 2, 1998, p0302NYM159.
"Thread: Pay Per Impression Programs", Digital Point Forums, Mar. 2005, found online at forums.digitalpoint.com/showthread.php?t=12248.
Nancy Trejos, "Travelers have no patience for slow mobile websites", dated May 6, 2012, http://www.usatoday.com/USCP/PNI/Features/2012-05-06-PNI0506tra-website-speedART_ST_U.htm.
Gary Stoller, "For Travel Companies, the slower the website, the smaller the potential profit", dated Jun. 1, 2011, http://www.usatoday.com/MONEY/usaedition/2011-06-02-travelweb-27ART_CV_U.htm.
File History of U.S. Appl. No. 10/373,096.
File History of U.S. Appl. No. 10/270,672.
File History of U.S. Appl. No. 11/159,398.
File History of U.S. Appl. No. 12/755,127.
File History of U.S. Appl. No. 13/606,494.
File History of U.S. Appl. No. 13/712,614.
File History of U.S. Appl. No. 11/774,489.
File History of U.S. Appl. No. 12/371,548.
File History of U.S. Appl. No. 13/842,913.
Oct. 22, 2009, "Suppliers Work on Ancillary Air Fee Reporting" McNulty Business Travel News.
File History of U.S. Appl. No. 13/117,303.
File History of U.S. Appl. No. 13/277,923.
File History of U.S. Appl. No. 13/593,108.
File History of U.S. Appl. No. 13/830,410.
File History of U.S. Appl. No. 13/830,319.
File History of U.S. Appl. No. 14/036,320.
File History of U.S. Appl. No. 14/060,960.

(56) References Cited

OTHER PUBLICATIONS

File History of U.S. Appl. No. 13/396,255.
File History of U.S. Appl. No. 13/712,629.
www.concur.com, from Web Archive, http://web.archive.org/web/20000622043004/http://www.concur.com/, archived Jun. 22, 2000, printed Jan. 6, 2014 (428 pages).
www.outtask.com, from Web Archive, http://web.archive.org/web/20001009025559/http://www.outtask.com/, archived Oct. 9, 2000, printed Jan. 6, 2014 (8 pages).
File History of U.S. Appl. No. 11/763,562.
File History of U.S. Appl. No. 12/901,947.
File History of U.S. Appl. No. 13/277,916.

* cited by examiner

METHOD AND SYSTEMS FOR DETECTING DUPLICATE TRAVEL PATH

CROSS-REFERENCE TO RELATED APPLICATIONS

This application claims the benefit of U.S. Provisional Application Nos. 61/569,942, filed Dec. 13, 2011 (Attachment A), and 61/569,949, filed Dec. 13, 2011 (Attachment B). This application is a Continuation-in-Part of U.S. patent application Ser. No. 13/593,108, filed Aug. 23, 2012 (Attachment C), which claims the benefit of U.S. Provisional Application No. 61/529,680, filed Aug. 31, 2011 (Attachment D). This application is also a Continuation-in-Part of U.S. patent application Ser. No. 13/277,923, filed Oct. 20, 2011, which claims the benefit of U.S. Provisional Application Nos. 61/405,480, filed Oct. 21, 2010, and 61/405,488, filed Oct. 21, 2010. This application is also a Continuation-in-Part of U.S. patent application Ser. No. 13/277,916, filed Oct. 20, 2011, which claims the benefit of U.S. Provisional Application Nos. 61/405,480, filed Oct. 21, 2010, and 61/405,488, filed Oct. 21, 2010. This application is also a Continuation-in-Part of U.S. patent application Ser. No. 12/901,947, filed Oct. 11, 2010, which claims the benefit of U.S. Provisional Application No. 61/324,533, filed Apr. 15, 2010. This application is also a Continuation-in-Part of U.S. patent application Ser. No. 12/773,282, filed May 4, 2010, which claims the benefit of U.S. Provisional Application No. 61/324,533, filed Apr. 15, 2010. This application is also a Continuation-in-Part of U.S. patent application Ser. No. 11/763,562, filed Jun. 15, 2007, which is a Continuation of U.S. patent application Ser. No. 10/270,672, filed Oct. 16, 2002 (now abandoned), which, in turn, claims the benefit of U.S. Provisional Application No. 60/329,281, filed Oct. 16, 2001. This application is also a Continuation-in-Part of U.S. patent application Ser. No. 13/396,255, filed Feb. 14, 2012, which is a Continuation of U.S. patent application Ser. No. 12/755,127, filed Apr. 6, 2010 (now U.S. Pat. No. 8,140,361), which is a Continuation of U.S. patent application Ser. No. 10/373,096, filed Feb. 26, 2003 (now U.S. Pat. No. 7,720,702). This application is also a Continuation-in-Part of U.S. patent application Ser. No. 13/117,303, filed May 27, 2011, which is a Continuation of U.S. patent application Ser. No. 11/159,398, filed Jun. 23, 2005 (now U.S. Pat. No. 7,974,892), which, in turn, claims the benefit of U.S. Provisional Application No. 60/581,766, filed Jun. 23, 2004. All of the foregoing are incorporated by reference in their entireties for all purposes.

This application is also related to U.S. patent application Ser. No. 11/774,489, filed Jul. 6, 2007 (now abandoned) (Attachment E), which is incorporated by reference in its entirety for all purposes.

BRIEF DESCRIPTIONS OF THE DRAWINGS

DETAILED DESCRIPTION OF SEVERAL EMBODIMENTS

The systems and methods described herein may use one or more computers. A computer may be any programmable machine capable of performing arithmetic and/or logical operations. In some embodiments, computers may comprise processors, memories, data storage devices, and/or other commonly known or novel components. These components may be connected physically or through network or wireless links. Computers may also comprise software which may direct the operations of the aforementioned components. Computers may be referred to with terms that are commonly used by those of ordinary skill in the relevant art, such as servers, PCs, mobile devices, and other terms. It will be understood by those of ordinary skill that those terms used herein are interchangeable, and any computer capable of performing the described functions may be used. For example, though the term "server" may appear in the following specification, the disclosed embodiments are not limited to servers.

Computers may be interconnected via one or more networks. A network may be any plurality of completely or partially interconnected computers wherein some or all of the computers are able to communicate with one another. It will be understood by those of ordinary skill that connections between computers may be wired in some cases (i.e. via Ethernet, coaxial, optical, or other wired connection) or may be wireless (i.e. via WiFi, LTE, or other wireless connection). Connections between computers may use any protocols, comprising connection oriented protocols such as TCP or connectionless protocols such as UDP. Any connection through which at least two computers may exchange data may be the basis of a network.

Figure 1:
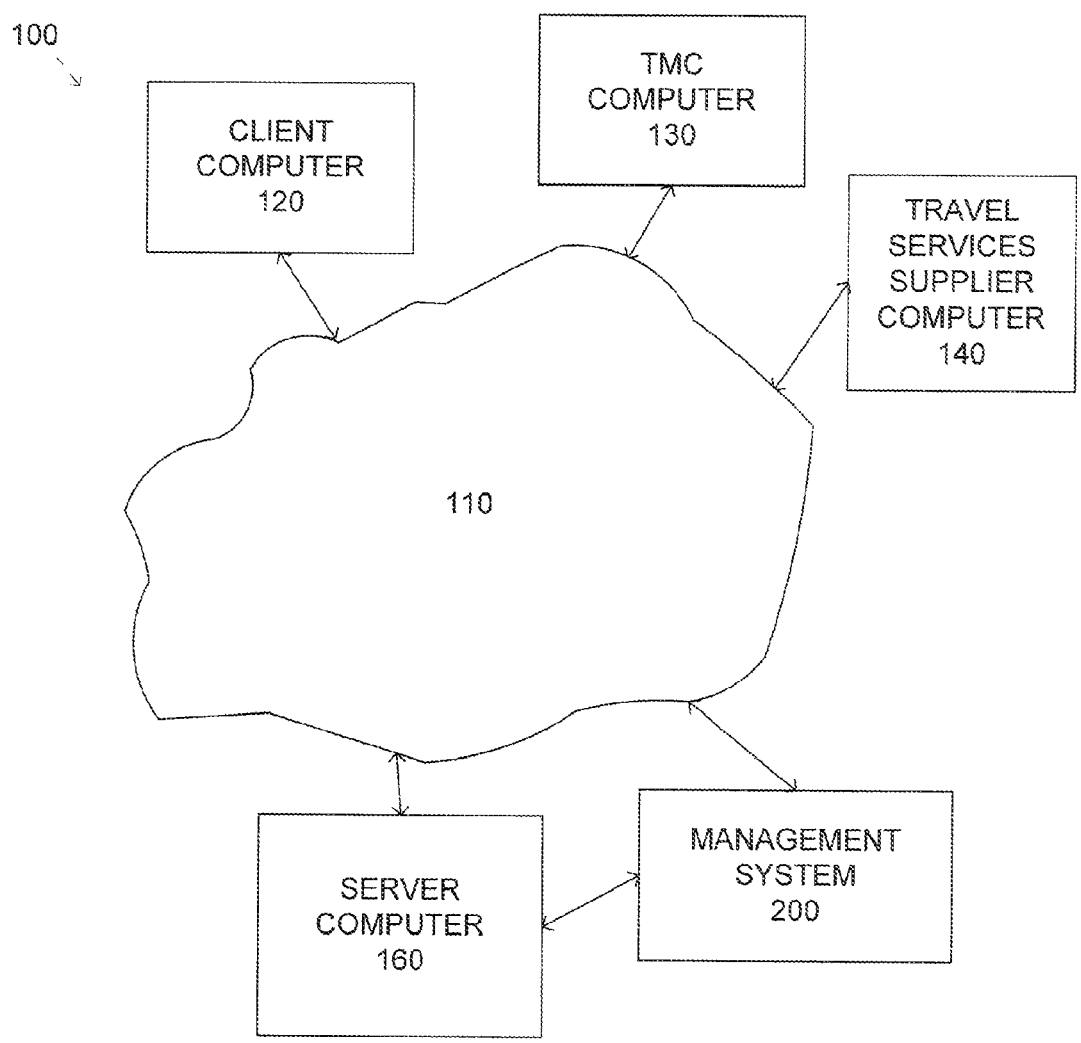
FIG. 1 depicts a system for travel management, according to an embodiment of the invention.

FIG. 1 depicts a system 100 for travel management, according to an embodiment of the invention. System 100 may provide travel and/or expense management services after retrieving information from multiple sources. The multiple sources may comprise at least two of the following: a supplier direct connection, an online booking tool, an email from a user, or a travel agent, or any combination thereof. Travelers may have some or all of their travel arrangements made and/or expenses paid by another person or entity, for example in the case of an employee of a company traveling for company business. Even when such arrangements are in place, travelers may wish to customize travel options such as flight times, hotel choices, rental car types, and the like. System 100 may integrate with traditional travel management corporation (TMC) and/or travel agency, systems, may allow travelers to book travel services via the internet or other network, and may also accept itineraries provided by travel service suppliers directly, for example via e-mail. Information about travel bookings from various sources of origin may be combined into a single reporting facility, integrated with expense reports, and/or feed a system that may track the location of travelers. For example, travel service suppliers may provide itineraries directly to a management server for bookings made on their websites or through their call centers, and individual travelers may choose to enable information sharing between travel service suppliers and the management server. Corporate travel policies may be applied to all booked travel, regardless of channel. Additionally, system 100 may integrate with TMC systems so that travel counselors may monitor reservations made by a traveler, regardless of channel. System 100 may also be used by individual travelers and/or travel agents to combine and coordinate travel itinerary components from multiple vendors or sources.

The system 100 of FIG. 1 may comprise one or more computers in communication with one another via a network 110 (for example, Internet, intranet). Those of ordinary skill in the art will appreciate that other embodiments may comprise computers that are interconnected via other types of networks. One or more of the computers in the network 110 may be client computers 120. Client computers 120 may be personal computers or handheld devices comprising web browsers or mobile applications, for example. The network 100 may comprise one or more travel management corporation (TMC) computers 130 (for example, computers associated with travel agencies or online booking services such as Expedia, Hotwire, etc.) and/or travel service supplier computers 140 (for example, computers associated with travel vendors such as airlines, hotels, and/or car rental agencies). In some cases, the TMC computers 130 may be operated by travel agents who may communicate directly with a traveler and enter itinerary data into a TMC computer 130. TMC computers 130 may also be associated with global distribution systems (GDS) such as Sabre, Apollo, Amadeus, etc. The network 100 may also comprise one or more server computers 160. As will be described in greater detail below, server computer 160 may be in communication with management system 200, and may use data supplied or processed by client computers 120, TMC computers 130, travel service supplier computers 140, or any combination thereof, to manage travel information.

Figure 2:
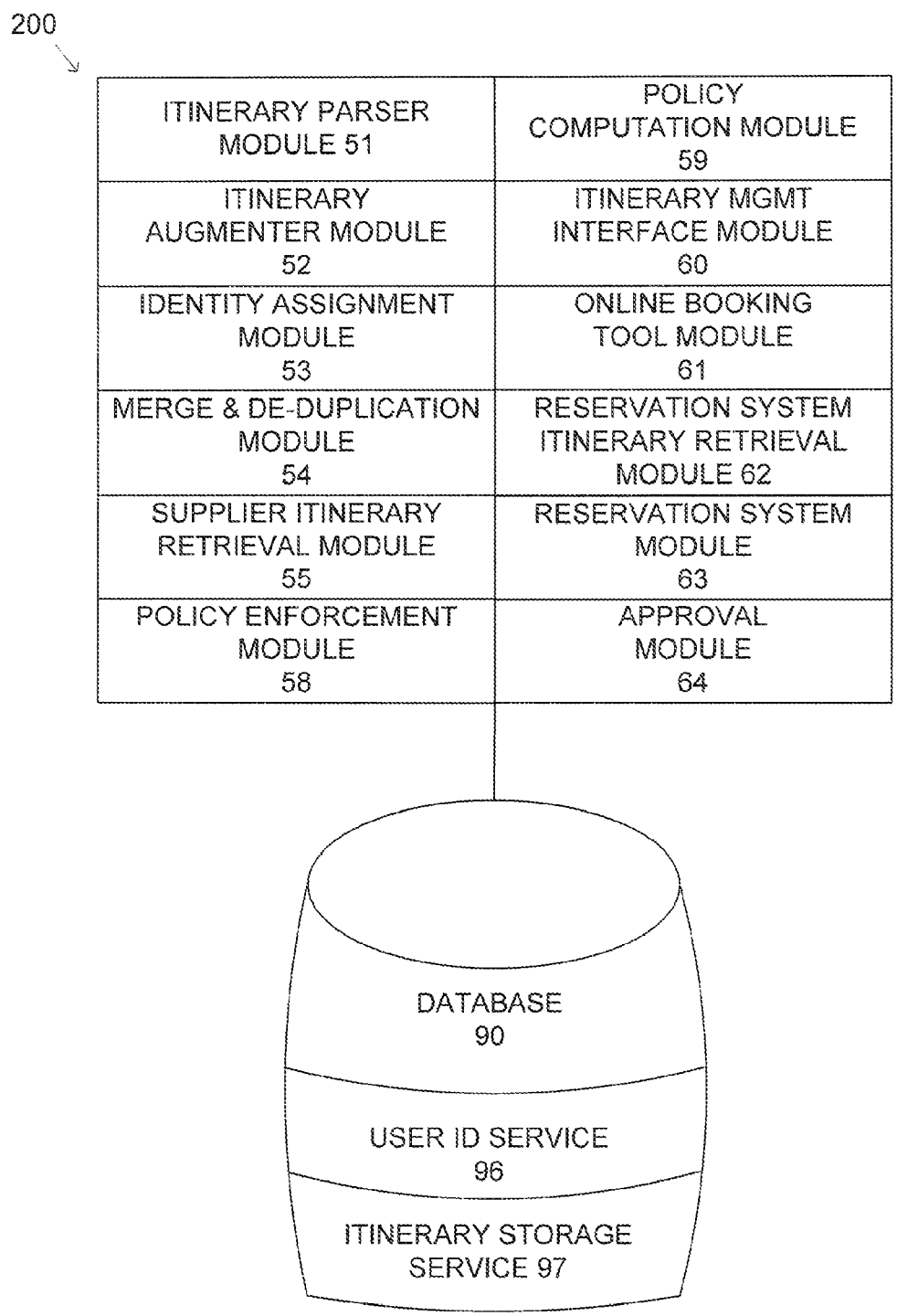
FIG. 2 depicts a management system, according to an embodiment of the invention.

FIG. 2 depicts a management system 200 according to an embodiment of the invention. The management system 200 in this embodiment may comprise a database 90 and may be in communication with the network 110 as described above. The management system 200 may comprise an itinerary parser module 51, an itinerary augmenter module 52, an identity assignment module 53, a merge and de-duplication module 54, a supplier itinerary retrieval module 55, a user identity service module 96, an itinerary storage service module 97, a policy enforcement module 58, a policy computation module 59, an itinerary management interface module 60, an online booking tool module 61, a reservation system itinerary retrieval module 62, a reservation system module 63, or an approval module 64, or any combination thereof. The functions of these components are described in greater detail with respect to FIG. 3 below. It will be understood by those of ordinary skill in the relevant art that components and/or functions may be omitted, changed, and/or added in various embodiments. In some cases, the components and/or functions may be distributed among multiple computers. It will be further understood by those of ordinary skill in the relevant art that other components may perform the functions described below.

Various combinations of the computers, networks, and modules discussed above may be used to arrange and/or track travel plans, itineraries, costs, or any combination thereof. For example, online travel booking tools that communicate with travel reservations systems to make bookings and online expense reporting tools may be employed alone or in combination by users to book and expense business or other reimbursable travel and, in some cases, take advantage of corporate or other travel discount programs. These systems and methods may provide reduced costs and/or greater visibility into where employees may be traveling, what they may be spending, what may be reimbursed, etc. Users of client devices 120 may book travel arrangements with a TMC computer 130 or travel service supplier computer 140, for example. In some cases, the TMC computer 130 or travel service supplier computer 140 may be a corporate system provided by a user's employer or may be associated with a preferred vendor of the employer. However, in other cases, the TMC computer 130 or travel service supplier computer 140 may be a third party system with no affiliation to the employer. As described below, users (such as a traveler or employer) may be able to integrate travel plans made with any source.

Figure 3:
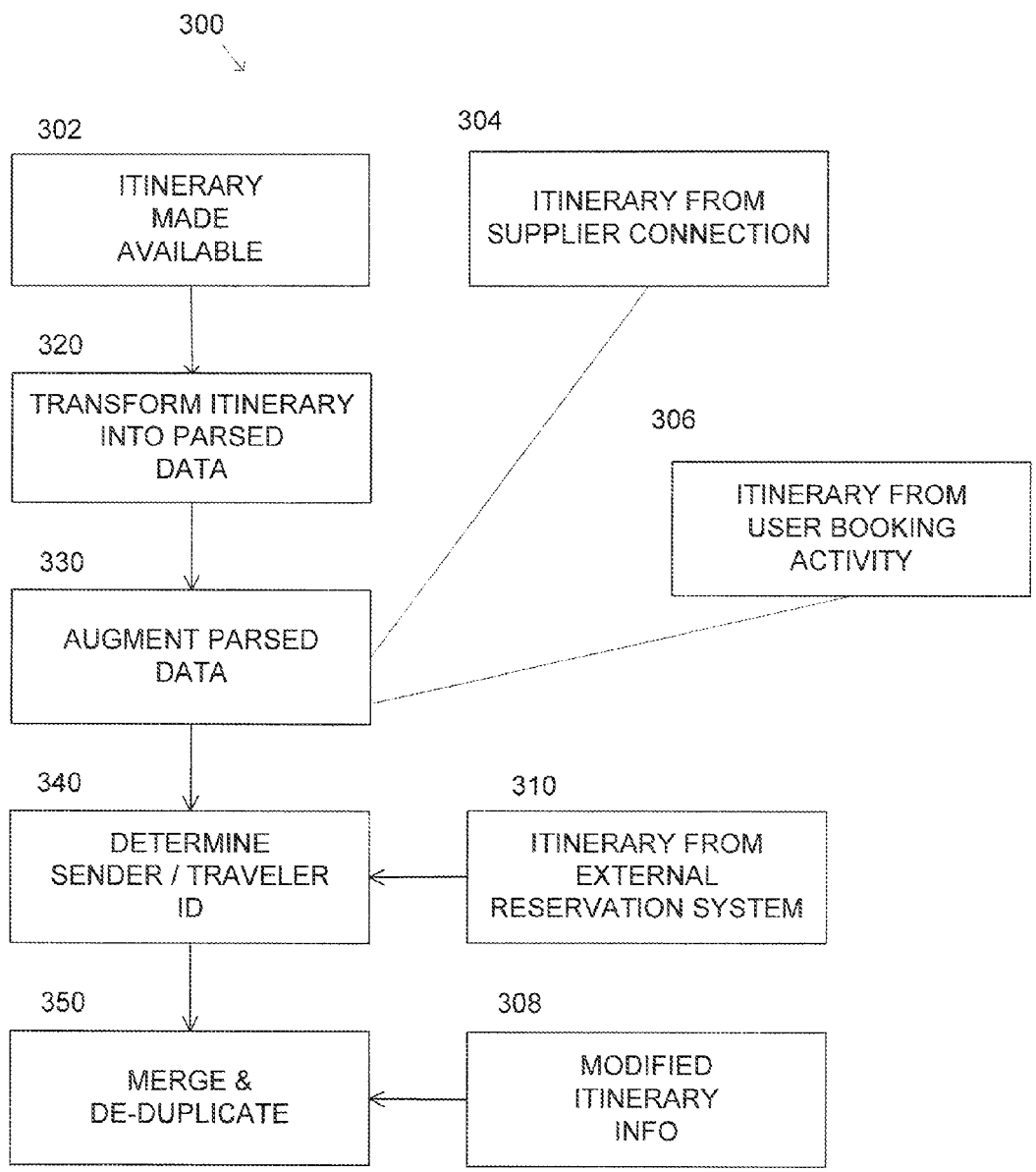
FIG. 3 depicts a data acquisition process according to an embodiment of the invention.

FIG. 3 depicts a data acquisition process 300 according to an embodiment of the invention. This process 300 may enable aggregation of itineraries from multiple sources, and various actions may be performed with that data. For more information on this process, refer to, for example, U.S. provisional patent application 61/529,680, filed on August 31, which is incorporated by reference. Any of the other patents and/or patent applications incorporated by reference may also provide information.

Referring to FIG. 3, in 302 an itinerary may be forwarded (e.g., emailed) or otherwise made accessible to an itinerary parser module 51. The itinerary may be forwarded to the itinerary parser module 51 by a user who has booked the itinerary and received an emailed copy of the itinerary. The itinerary may also be forwarded to the itinerary parser module 51 automatically by the TMC computer 130 or travel service supplier computer 140 after the user books the itinerary. Itineraries may be emailed by a traveler when, for example, a traveler books some or all of their trip directly with a supplier or through a site like Expedia or Hotwire. The traveler may forward an email itinerary confirmation to the itinerary parser module 51. For example, if someone emails a hotel reservation, the management system 200 may see if there already is a flight or car reservation for the same dates, as will be described in greater detail below. Sometimes an e-mail may be for a change to a reservation. For example if a traveler has a Hertz reservation for March 9-10 and they email another Hertz reservation for March 9-11 in the same city, the change may represent an extension of a trip by a day. Sometimes an e-mail may be a replacement of an existing reservation. For example, if a traveler has a Hilton reservation for May 3-9 and then emails a Marriott for May 3-9, it may indicate that they canceled the Hilton for the Marriott. If it cannot be determined whether an email and/or itinerary update is for a new segment, a change to an existing segment, or a replacement, the traveler may be contacted, as will be described in greater detail below.

In 320, the itinerary parser module 51 may use various technologies to transform the itinerary into structured data representing an itinerary, for example, by comparing the email body to various templates, determining the template that matches the best, and running that template on the email text. Some itinerary emails may lack full information about the content, and some information may be unable to be parsed from an email because, for example, suppliers may change email formats frequently and the itinerary parser module 51 may not get any advanced notice of those changes. Accordingly, additional processing may be performed after the email is received and parsed. For more information on the itinerary parser and template process, please refer to U.S. patent application Ser. No. 11/774,489, filed Jul. 6, 2007, which is incorporated by reference. Any of the other patents and/or patent applications incorporated by reference may also provide information.

The itinerary parser module 51 may analyze each email that is received to try to identify attributes about the itinerary from the email. Some email templates may comprise electronic documents that describe a corpus of known emails, and some email templates may describe general structures for emails so that an attempt may be made to parse emails that have not previously been encountered. The electronic documents may identify where in the email key pieces of data may be found. For example, if an airline has a table with a column heading of flight number, the email template may describe the heading and instruct the parser to identify all the data in that column to be flight numbers for the various flights. All information that can be parsed from the itinerary may be transformed into a standard electronic format, such as Extensible Markup Language (XML), to be processed further by other modules. This use of a standard format may allow, for example, for parsing of very large numbers of different itinerary emails in different languages.

Once the email is structured into an itinerary, in 330 the structured data may be augmented by an itinerary augmenter module 52. The augmenter module 52 may add data to the itinerary that may be gleaned from other sources, comprising static databases. For example, if the itinerary parser module 51 were able to determine that Alaska Airlines flight 1 was on the itinerary, but could not tell the departure or arrival cities or the flight times, the augmenter could look this flight up in a database of flight schedules and determine that Alaska Airlines flight 1 flies from Ronald Reagan National Airport to Seattle-Tacoma International Airport. This information could then be added to the itinerary by the itinerary augmenter module 52, even though it was not parsed directly from the email. In order to augment the itinerary, information may be pulled from documents in a database and/or a link to a web site. Once the itinerary is augmented, in 340 the identity of the sender of the email may be determined by an identity assignment module 53. The identity assignment module 53 may use information from a user identity service 96, which may be an element of a database 90 or a standalone database. The identity assignment module 53 may cross-reference information from the user identity service 96 with information in the original email. For example, the identity assignment module 53 may examine a "from" email address in the email and may cross-reference that address with email addresses for users in the identity service 96. In another example, one person may be managing travel for multiple people. In this case, the person booking the travel may put the traveler's email address or some other identifier in the subject line of the email prior to forwarding it to the itinerary parser module 51. The identity assignment module 53 may then recognize the traveler's identifier in the email. The traveler's information may comprise the traveler's name and/or the entity and/or company the traveler is associated with. Those of ordinary skill in the art will recognize that there may be many ways to embed identity information in an email The identity assignment module 53 may also receive itineraries directly from suppliers. For example, in 304 a connection between the management system 200 and a TMC computer 130 or travel service supplier computer 140 may be made via a supplier (e.g., using an access connection using an Open Authorization (OAuth) connection). In this example, in 106 the supplier may pass the itinerary to the identity assignment module 53 in a structured format with an access token, and the identity assignment module 53 may cross-reference the access token with tokens defined in the identity service 96.

In an embodiment of the invention, travelers may be presented a list of participating suppliers, and the status of the linking with that supplier. A traveler may not have an affinity number with a supplier, or may have a number but not entered it into management system 200. For those suppliers, the traveler may be prompted to enter the number, or to activate a link which would take the traveler to a destination (e.g., a web page or a mobile application) where the traveler may sign up for that supplier's affinity program. At the conclusion of the signup, the traveler may be taken to a destination that asks the traveler to re-authenticate with the management system 200 and may be asked which personal data the user agrees to share with the supplier. Prior to displaying the re-authentication message, the supplier's server and the management system 200 may communicate to create a temporary request token that identifies the specific request that may then occur. Should the user re-authenticate, the request token may be used to then generate an access token, which may be used in future communications to uniquely identify the user to both the supplier and the management system 200. If a traveler already has an affinity number with a supplier but the accounts are not linked, then the management system 200 may take the traveler to the destination on the supplier's site where the re-authentication process would occur as described in the previous example. Again, the result may be an access token that uniquely identifies the traveler in both systems. If a traveler has an affinity number with a supplier and the accounts are linked, the traveler may either change the settings for what data can be exchanged between management system 200 and supplier, or disconnect the link. Disconnecting the link may involve simply deleting the access token from the management system 200, which may cause any attempt to connect using that token to fail as there would no longer be any record of that token in the management system 200. The supplier may also be notified prior to deleting the access token.

In another embodiment, the connection between the management system 200 and the supplier may be done in a batch process. A given traveler could indicate that he wishes to share information with all eligible suppliers. When a traveler adds a new affinity number to his profile, or when one is added by a third party (e.g., a travel arranger and/or a travel agent), that traveler's account may be transmitted (e.g., via a secure file transfer, via a web service, or via some other mechanism), potentially with a list of other accounts, to each applicable supplier. Those of ordinary skill in the art will recognize that there are multiple other ways to send data to suppliers. The data transmitted may comprise the affinity number of the traveler and/or other unique information to identify a person (e.g., full legal name, address, or any other mutually agreed-upon fields). The supplier may validate that the affinity number does indeed match the described person, and then (e.g., via web service, batch file, or some other method), generate the access token.

Those of ordinary skill in the art will recognize that there are other ways to associate identities across multiple systems, and that while Oauth is a current standard, there are other standards and proprietary methods that could serve the same purposes.

When the identity has been linked, the supplier may transmit itineraries through the supplier connection 304 and the linked identity can be used in 340 to ensure that the itinerary is associated with the correct account.

Those of ordinary skill in the art will recognize that there may be multiple ways to tie identity information to a structured itinerary data record. For example, suppliers like Avis and Best Western, may automatically forward itineraries for travelers in cases wherein a user account with the system 200 has been linked to a frequent flier/frequent traveler account at a supplier site. As another example, account linking may also enable transfer of discount codes and/or coordination of locations for various travel services. In 340, itinerary data received in this manner may be processed to determine a traveler identity from embedded information in the itinerary.

Itinerary data may also be generated by a user interacting directly with elements of the management system 200 directly or remotely. In 306, itinerary data generated in this manner may be received by the identity assignment module 53. For example, the user may book a reservation or change an existing booking via an the online booking tool module 61 and/or updating an itinerary with new or updated itinerary information. The itinerary information may be updated using information internal to the management system 200 (e.g., using internal databases, etc.) or information external to the management system 200 (e.g., using external databases, links to web sites, etc.) The online booking tool module 61 may be a component which may interact with a client application running in a web browser on the client computer 120 or with an application running on an Internet-connected smartphone, tablet, or desktop client computer 120. As one of ordinary skill in the art would understand, these are merely examples of the systems that may incorporate an online booking tool. As one of ordinary skill in the art would understand, the external reservation system may be an aggregated Global Distribution System (GDS) that may interact with many different vendors' systems for different types of inventory, a reservation system for multiple vendors of a particular type of inventory, or a direct connection to a travel vendor's reservations system, or any combination thereof.

In 310, information about new and modified trips may be received by the supplier itinerary retrieval module 55, for example via scheduled polling of at least one external reservations system (such as a TMC computer 130 or travel service supplier computer 140), automated pushes from at least one external reservations system, or any combination thereof. The polling or pushes may send data about trips that the external reservation system may recognize as being booked for a particular user. As one experienced in the art will understand, the one or more external reservation systems may be aggregated Global Distribution Systems (GDS) that may communicate with many different vendors' systems (such as TMC computers 130 or travel service supplier computers 140) for different types of inventory, a reservation system for multiple vendors of a particular type of inventory, a direct connection to a travel vendor's reservations system (such as a TMC computer 130 or travel service supplier computer 140), or any combination thereof. The updates received by the supplier itinerary retrieval module 55 may represent itineraries that have been created or updated, for example, by a travel agent as the result of a user calling a travel booking desk versus using an online booking tool 61 or other online tool, as the result of flight changes resulting from airline schedule updates, upgrade processing, seat changes, or being confirmed on flights for which a user was previously waitlisted. As one of ordinary skill in the art would recognize, these are merely examples of some of the many reasons why a new or updated itinerary may be processed by the supplier itinerary retrieval module 55 and there are many other reasons why an itinerary may be processed by the supplier itinerary retrieval module 55.

It should be noted that, in 330, itinerary data received from sources explained in 302, 304, 306, 310, or from any other sources, or any combination thereof, may be augmented. Similarly, in 340, itinerary data received in 302, 304, or 306, or any other manner may be processed to determine a traveler identity from embedded information in the itinerary. For non-emailed itinerary data, in 340 the identity assignment module 53 may use information from the user identity service module 96 and may cross-reference that information with information present in the received itinerary. For example, the user associated with an itinerary may be identified by searching for specially formatted entries in the itinerary that may embed a user ID known to module 96 into specially-formatted remarks or other information in the itinerary. If such a known ID may be extracted from the itinerary, the itinerary may be assigned to the user identified by the user identity service module 96. In addition, identifiers tying the trip to a particular company or sub-unit within a company may also be embedded. Matching may be done at each level (i.e. user, sub-unit, company, etc.), and the trip may be assigned at a most granular matching level. For example, if a trip cannot be assigned to a particular user, but may be assigned to a sub-unit, the user identity service module 96 may mark the trip as belonging to the identified sub-unit. In addition to coded and embedded identifiers, matches may be identified for traveler email addresses in the itinerary, in combination with less-granular information such as the company associated with the trip. For example, a trip may be booked by a user with a given email address for travel to be paid for by their own employer, or a trip may be booked by a user with a given email address for travel to attend a meeting being offered by a different company. There are many other ways to embed identity information in an itinerary or match user information from the itinerary against known identifiers such as travel vendor affinity programs (e.g. frequent flier numbers, hotel frequent guest programs, etc.), and multiple ways to use the varying levels of identifying information to tie a trip to a particular company, corporate sub-unit, user, or other entity.

Regardless of the channel through which itinerary information is received, in 350, processed itinerary information and sender/traveler information may be sent to a merge and de-duplication module 54 for merging and de-duplication processing, which is described in greater detail below with respect to FIG. 4. For more information on this merging and de-duping process, please refer to U.S. provisional patent application 61/529,680, filed on Aug. 31, 2011 and entitled "Method and System for Detecting Duplicate Travel Path Information", which is attached as Attachment A.

It should also be noted that, in some embodiments, in 308, modified itinerary information may be sent. For example, users may be able to modify itineraries, for example by interacting with a program on the client computer 120 which may send itinerary modification instructions to the management system 200. In this event, in 350, the modified itinerary data may be sent to the merge and de-duplication module 54 for further processing.

Figure 4:
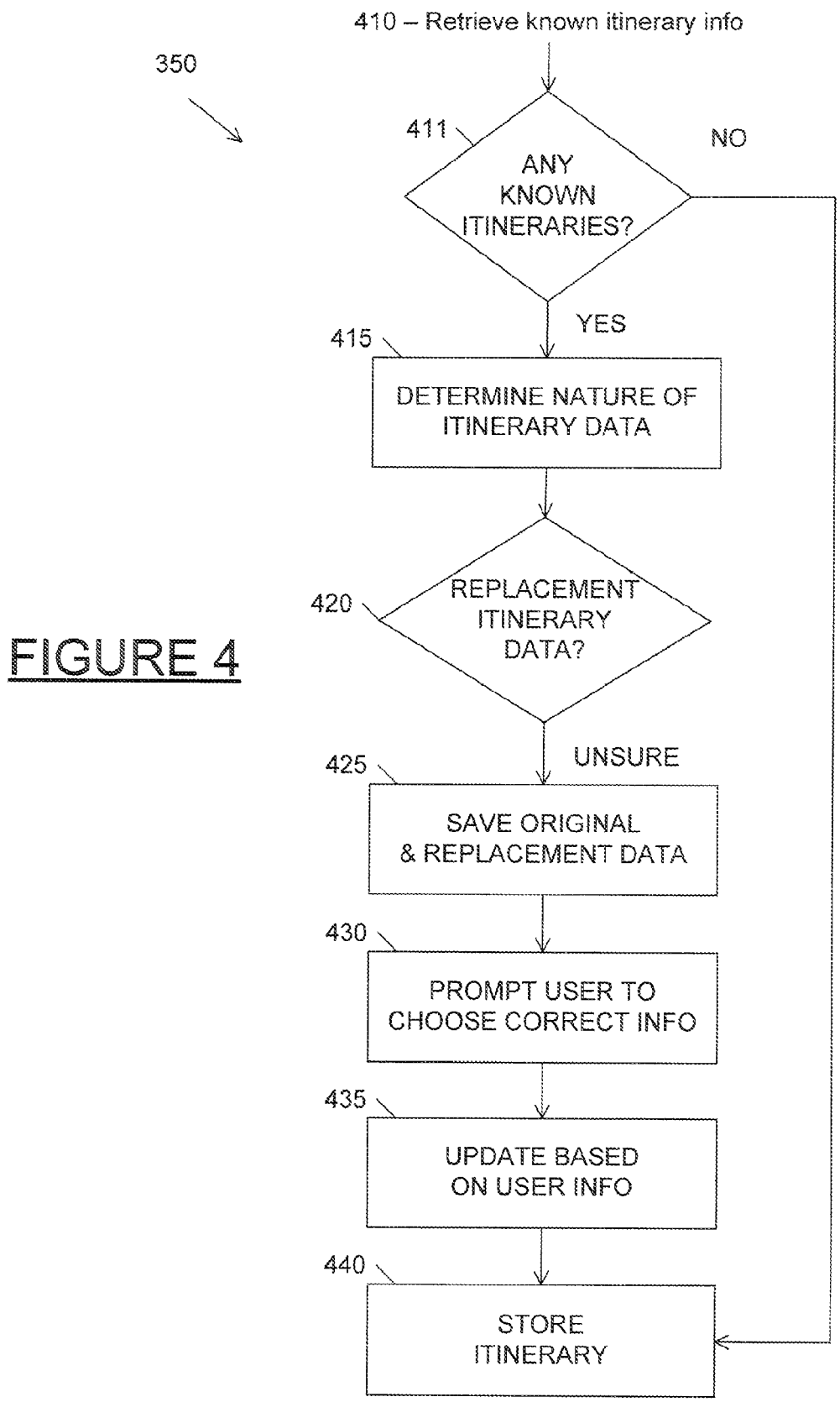
FIG. 4 depicts a merge and de-duplication process according to an embodiment of the invention.

FIG. 4 depicts a merge and de-duplication process 350 according to an embodiment of the invention. As noted above in FIG. 3, once the itinerary data has been received and assigned to a specific identity, in 350 it may be sent to the merge and de-duplication module 54. In 410, the merge and de-duplication module 54 may retrieve all known itineraries for the associated person from an itinerary storage service 97, which may be an element of a database 90 or a standalone database. In 411, the merge and de-duplication module 54 may determine whether or not there are any known itineraries. If no known itineraries are found, in 440 the merge and de-duplication module 54 may store the itinerary data in the itinerary storage service 97.

If one or more known itineraries are found, in 415, the merge and de-duplication module 54 may determine the nature of the itinerary. For example, it may be determined whether the given itinerary represents a new trip, a new segment for an existing trip (e.g. a hotel reservation associated with a trip wherein previously only an air reservation was associated with the trip in the itinerary storage service 97), an update to a segment for an existing trip (e.g. date changes for a previously reserved hotel), or duplicate information already received which may be discarded, or any combination thereof.

In 420 the merge and de-duplication module 54 may determine a likelihood that the current itinerary may be intended to replace a previous, but different, reservation. For example, if a person has a flight from Charlottesville, Va. to Fargo, N. Dak. departing on March 9th and returning on March 11th, and that itinerary has a Marriott hotel reservation in Fargo, and the merge and de-duplication module 54 receives an itinerary for the same person, corresponding to a Hilton hotel reservation in Fargo for the 9th through the 11th, the merge and de-duplication module 54 may determine that it is likely that the Marriott hotel reservation was canceled and the person is now staying at the Hilton. If the merge and de-duplication module 54 cannot be certain whether or not a given itinerary segment should be replaced, then in 425 both the original and the new segment may remain in the itinerary. In 430, the user may then be prompted by an itinerary management interface module 110 to indicate which itinerary is current. For example, the itinerary management interface module 110 may deliver the prompt to the client computer 120 for display to the user. In 435, the merge and de-duplication module 54 may receive a response from the client computer 120 and may remove the itinerary data that is not current while retaining the itinerary data indicated as current by the response. In 440, the itinerary may be stored in the itinerary storage service 97.

Figure 5:
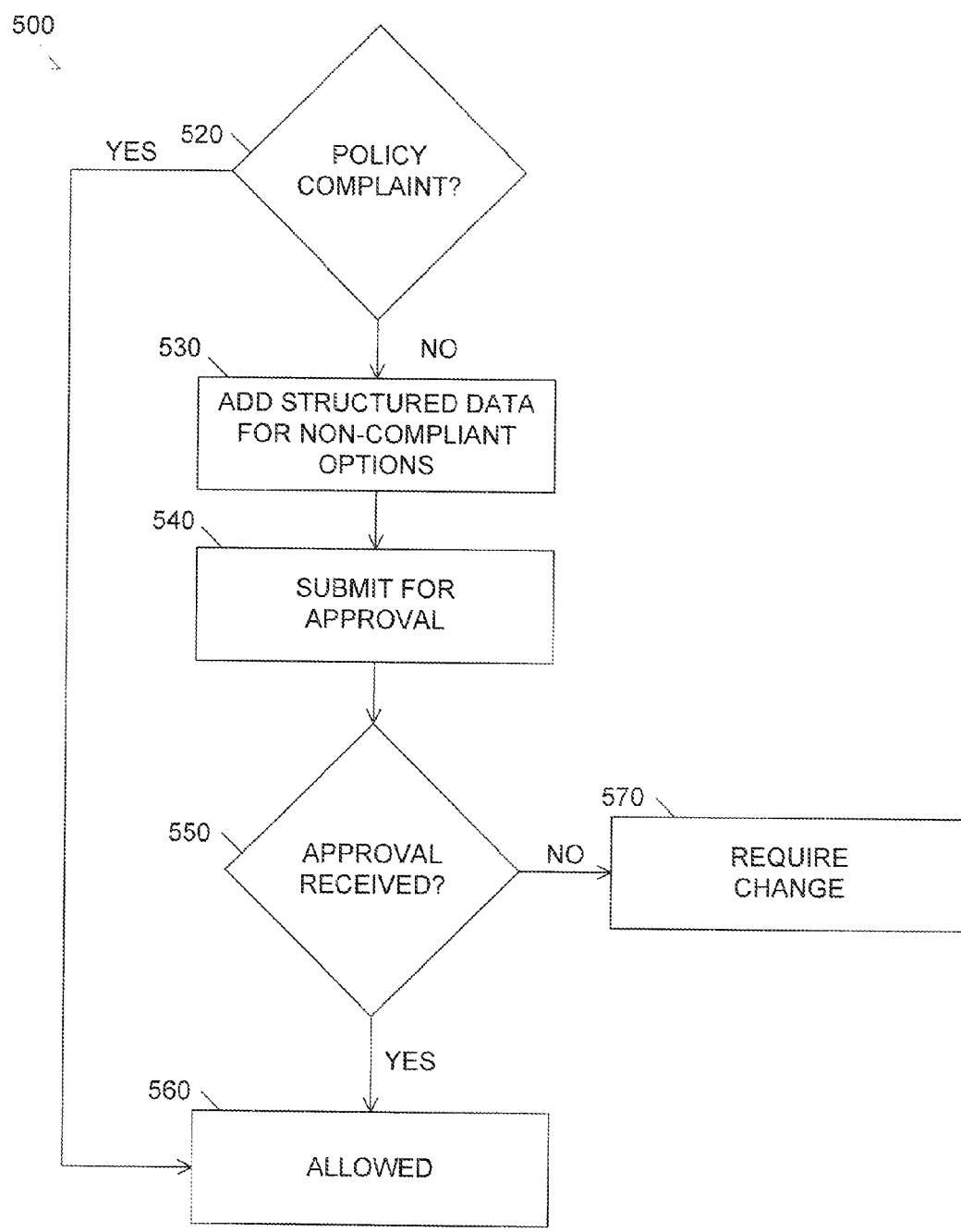
FIG. 5 depicts a compliance determination process according to an embodiment of the invention.

FIG. 5 depicts a compliance determination process 500 according to an embodiment of the invention. It should be noted that the compliance determination may be done before or after an itinerary is stored. For example, if a booking is made externally at a supplier site, Expedia, etc., then the policy may not be run until the itinerary is stored. However, if, for example, the booking is made through the management system 140, the policy may be enforced before the booking is made so a user may know whether their booking will be in or out of policy.)

Referring to FIG. 5, in 520, the policy enforcement module 58 may evaluate the itinerary to determine if the itinerary is policy compliant, applying one or more policies to segments of the itinerary and/or on the itinerary as a whole, to identify which travel items are in compliance and/or whether the itinerary as a whole is in compliance with entity/corporate travel policy. For example, benchmark data may be used to determine what a trip (or more accurately, each component of a trip) should cost. Once the cost of a trip is determined, it may be compared to the benchmark. If it is over the benchmark, then a notification may be sent or made available (e.g., to the user, traveler, or manager, or any combination thereof). In this manner, even if a user makes an out of policy booking on an outside web site (e.g., a supplier site), the reservation may still be changed if notification is provided in a timely manner then that can be acted upon by the traveler. In addition, very detailed information may be collected regarding the policies. For example, which rules are violated and information about the parameters of what is violated (e.g., the cheapest flight when a flight violates a cost rule) may be collected. For more details on how policies may be enforced, refer to any or all of the Attachments and/or published applications that are incorporated by reference.

If the itinerary is policy compliant, the process may proceed to 560, where the trip is allowed. In 530, if some or all of the itinerary is non-compliant, the policy enforcement module 58 may add additional structured data for the itinerary as a whole and/or for the individual segments booked identifying whether each is in or out of compliance; and, if an element of the itinerary is out of compliance, additional structured data about the non-compliance which may comprise parameters indicating the criteria used to determine non-compliance and/or the severity. The itinerary storage service 97 may then store the itinerary structured data augmented with the policy data.

Any itinerary which may be processed and put into the itinerary storage service 97 may have been updated with additional structured data regarding the policy compliance of the itinerary as a whole and/or the compliance of each segment in the itinerary. The itinerary management interface module 60 may cause the compliance status of the itinerary and its segments to be displayed, for example on a client computer 120. For example, this displayed data may comprise showing which segments or the trip as a whole are in compliance, which require approval, which are flagged as notification for a manager, and/or any combination thereof. Graphic indicators regarding the compliance level such as use of the color green for compliance, yellow and/or a triangular warning sign shape for notification of a manager, and red and/or an octagonal stop sign shape and/or an exclamation point for requiring approval may be displayed alongside the description of the segment or the trip as a whole, for example. For those segments of a trip and/or the trip as a whole that are not policy-compliant, additional information about what policies are not being complied with may be displayed. As one skilled in the art will recognize, there may be many ways for the itinerary management interface module 60 to indicate policy compliance and/or non-compliance.

Regardless of the source of an itinerary or segments of an itinerary, the policy enforcement module 58 may also flag itineraries which violate policy as a whole or contain out of policy segments to be acted upon to bring them into compliance. In the case of an itinerary or segments that were booked in ways that are inaccessible to the management system 200 through the reservation system module 63 (e.g., bookings added to the system via email or user entry of the data via web forms), trips marked as out of compliance and requiring approval may cause the user to be notified via the itinerary management interface module 60 and client computer 120 that the segment and/or trip as a whole may not be considered a valid travel expense and may be ineligible for reimbursement to the user.

For those trips where an itinerary or segments that were booked are accessible via the reservation system module 63, the out-of-policy segments or trip as a whole may be made subject to an approval process in 540. For example, one or more policy managers, who may be other employees who either hold managerial or supervisory authority over the user or financial or travel supervisory responsibility over the user, may approve the itinerary as a whole or segments that violate policy. The order and identity of the users who are policy managers may be configurable within the policy enforcement module 58.

When the policy enforcement module 58 flags an itinerary as requiring approval by a policy manager, the policy enforcement module 58 may also send notifications to the policy manager that there is a trip requiring approval. The notification may be generated by an itinerary management interface module 60 for display on a client computer 120 such as, for example, a desktop computer or mobile device such as a smartphone or tablet. In some cases the notification may be comprised in a list of other users' trips requiring approval, email notifications sent to email addresses defined for the policy manager, SMS messages to the policy manager's cell phone number or numbers, or any combination thereof. As one skilled in the art will recognize, these are just examples of the means by which policy managers may be notified that there are trips pending their approval and other notification methods may be implemented.

In 550, once an approver (or each approver, depending on policy) in the defined list of policy managers for a given user has given their approval to the itinerary as a whole or segments that violate policy, then in 560 the out of policy portions of the trip may be allowed for booking (for example by being marked as in policy or being marked as allowable exceptions to the policy), and any pending actions to completely prepare the segments of the trip (for example issuing airline tickets) may be authorized as released and the itinerary or segments may be routed to the reservation system module 63. The reservation system module 63 may communicate any pending actions to booking systems such as TMC computer 130 or travel service supplier computers 140 for fulfillment.

If the itinerary or any segments which are out of policy are rejected during the approval process by any of the policy managers, or a time limit for approval is reached before policy managers have approved the out of policy itinerary or segments, then in 570 the policy enforcement module 58 may send or otherwise make available a notification to the client computer 120 which may instruct a user to update their itinerary to be in compliance by interacting with the itinerary management interface module 60, or the policy enforcement module 58 may request the online booking tool module 61 to cancel those parts of the trip that are accessible via the reservation system module 63 and notify the user of the cancellation. As one skilled in the art would recognize, this is merely one example response to itineraries that are not brought into compliance or approved by policy managers in a timely fashion and there are other processes that could be used.

The policy enforcement module 58 may allow users who have been granted permission to define travel policy to define the criteria on which policy enforcement on an itinerary or specific segment types of an itinerary (e.g. air, rail, car, hotel, etc.) may be based. The policy enforcement module 58 may also allow users who have been granted permission to store the criteria in the database 90 for use by the policy computation module 59. Example criteria for an airline journey may be defined based on the total cost of the ticket, a cabin of the aircraft in which a user is booked, the distance or flight time, the airline, or many other criteria. As one skilled in the art will recognize, these are just some of the criteria that may be used, and the criteria may be combined in many ways. As an example of the combinations, a cabin choice may be compliant with policy for some flight lengths in time or miles and non-compliant for some other flight lengths. For example, choosing a flight with 2 connections that takes 18 hours to travel from New York to San Francisco instead of the 6-hour non-stop may save a few hundred dollars but then cost more in lost productivity and morale. Accordingly, a company policy may permit a more expensive, but shorter, flight. However, the policy may also forbid upgrades for the shorter flight in order to control costs.

The policy computation module 59 may periodically search inventory for particular travel types, for example air travel, and may determine what the apparent cost of travel should be for a specific itinerary and dates based on similar or identical trips in the itinerary storage service 97. Authorized users, such as company officers for example, may define parameters specifying various criteria controlling what differences may be allowed in identifying similar trips. Example criteria may comprise how many days in advance comparable trips have been booked, for example comparable trips could be defined to comprise only those booked 7 days in advance, or 14, or may be matched against least cost or similar level of service selected. For similar level of service, an example may be that if the policy computation module has determined that a traveler is entitled to fly in a higher class of service than economy, then comparable trip costs may be considered only for itineraries in the itinerary storage service 97 booked in the same class of service.

For example, if a standard business travel hotel in New York City is booked 6 days in advance and costs $292 per night, and a traveler books 14 days in advance and spends $284 per night and e-mails the itinerary to the system 200, the booking may be acceptable to the policy. If the traveler spends $407, the system 200 may report that they overspent by $115.

In some embodiments, the system 200 may incent travelers to save money by letting them "bank" a portion of their savings to then spend if they want to travel more luxuriously on a future trip. We may provide reporting that looks at all of the itineraries. Because we get travel data from so many different places, we may provide a superior employee location tool, which helps them meet their duty of care requirements by letting them know who may be in trouble if an incident happens in a city. We may still do the matching of travel reservation data and credit card data that we covered in our first patent.

In addition, the online booking tool module 61 may apply policy compliance during the booking process before the user has made any reservation to identify which candidate choices for booking are in or out of policy for the user using the same structured data about non-compliance comprising parameters indicating the criteria used to determine non-compliance and severity. Itineraries with the structured data on policy compliance included may then be stored in the itinerary storage service 97. For example, when itinerary information is presented to a user during the booking process, itineraries may be filtered or flagged if they are non-compliant.

Itineraries may be presented via a user interface on the client computer 60 by the itinerary management interface 60. Additionally, a user may be presented with several actions to take on an itinerary or segments of the itinerary. Users may be able to add segments to an existing itinerary, for example. If the segment may be booked online, the itinerary management interface module 60 may invoke the online booking tool module 61 to allow the user to book a segment or segments online. A user may also add a segment manually to the itinerary, in which case the itinerary management interface module 60 may cause a user interface on the client computer 60 to present a user interface which may enable the user to enter the segment information directly. This information may then be added to the itinerary and the itinerary may then be processed by the merge and de-duplication module 54.

In some embodiments, expense reports may be generated based on the itineraries created and merged as described above. For more information on how expense reports may be generated, refer to the following: U.S. patent application Ser. No. 11/159,398, filed on Jun. 23, 2005 and entitled "System and Method for Expense Management" (attached as Attachment C); U.S. patent application Ser. No. 10/373,096, filed on Feb. 26, 2003 and entitled "System and Method for integrated Travel and Expense Management" (attached as Attachment D); and U.S. patent application Ser. No. 11/763,562, filed on Jun. 15, 2007 and entitled "System and Method for Managing Booking and Expensing of Travel Products and Services" (attached as Attachment E).

Expenses may be difficult to predict for various reasons. For a rental car example, a traveler may return a car with an empty tank of fuel and owe more than the base rate, a traveler may opt to use the rental company's insurance policy, a rental car may be returned early or late, and taxes may not be provided on the data feed. For a hotel example, telephone or room service fees are not contemplated in the reservation, and a traveler may check out early or late. In addition, a traveler may contact a vendor (e.g., car rental company, hotel) directly and change or cancel a reservation, and that change may or may not have been provided to the system 200 through any of the methods by which it may receive itineraries. For a flight example, with some refundable air tickets, the traveler may exchange the ticket at the airport for a different ticket, and this refund may not be reflected in the data available to the system 200 because the system 200 may not have access to any of the data sources available for a particular booking on that airline.

Credit card data feeds, where exact costs are known, may be more reliable and accurate than travel data feeds. It may be useful to have expenses submitted match not only the credit card data feeds, but also the travel data captured by the system 200. If certain data matches the credit card data feed, then management may know what expenses have been booked and not yet expensed, providing an estimate of amounts owed to employees. In addition, travel data received by the system 200 may contain more information than the credit card data feeds. Access to this additional information for reporting and data-mining purposes may enable management to make business decisions.

Credit card data may be linked to travel data. This association may be performed: to prevent duplicate submission (and possibly double-reimbursement) of the same expenses; to check the amount of the expense (travel data often have inaccurate amounts, and manually-inputted expense items may contain user errors); and to link the credit card data to the expense for reporting purposes.

In addition, data sources may contain varying levels of data quality. Some major credit card vendors charge customers for an automated data feed, with tiered rates where customers pay more for feeds with richer data and less for feeds with minimal data. Purchase dates often do not match travel dates, either because the vendor batches up several days' worth of charges and submits them at once, or because the ticket or hotel room or rental was paid in advance. Credit card data feeds do not always contain travel dates. Sometimes the credit card data feeds contain merchant codes, but other times the credit card data feeds only contain the name of the merchant, creating confusion (e.g., are "Value Inn" and "Value Inn Express" the same merchant?). It is not always possible to know with absolute certainty that a given credit card charge matches a specific travel event. A mechanism is needed to judge the probability of any credit card data matching a given travel event request and to match the most probable credit card data feed record with the most probable travel data feed record.

Furthermore, travel data sources also contain varying levels of data quality. Some GDS vendors have systems where all travel itinerary changes are transmitted on a data feed (e.g., the Galileo IDS system). Other travel data come from agencies and are limited to the data that the agency provides. In some cases, a travel record change is added to the travel data by having an agent manually make a selection or enter a code to add the change to the feed. This type of process is very prone to human error, so it is possible that the travel data feed may not contain the most up-to-date itinerary information. Any information (e.g., emailed itineraries, supplier provided travel data for an itinerary) may contain incorrect information.

In addition, the travel data known prior to the trip may not be representative of the trip actually taken. For example, the traveler may have a reservation at Hotel A, but may change that reservation to Hotel B if the traveler discovers that Hotel B is closer to a meeting site. A matching process that requires exact vendor match would never match the hotel reservation at Hotel A with the credit card charge at Hotel B the data feeds. However, as Hotel B was the hotel used on the trip, it would be useful to match the Hotel B credit card charge to the Hotel A reservation so that management knows that the Hotel A reservation will not be expensed in addition to the Hotel B credit card charge.

It should be noted that the itinerary information described throughout this application may be incorporated into an expense management system for inclusion into expense reports, automated creation of new expense reports, and matching against credit card feed data stored in the expense management system may be provided. An entity may be able to integrate not only data that matches exactly, but also to determine the likelihood that data that does not match exactly nevertheless corresponds. In one embodiment, the method may comprise: retrieving travel data records corresponding to travel requests; retrieving expense data records reflecting expense transactions; comparing the expense data records to the travel data records; and determining a likelihood that the expense data records match the travel data records.

In one embodiment, the traveler may pay for the travel event. The time of payment may vary from event to event on the same itinerary. For example, airline tickets are often purchased in advance, whereas hotel fees are typically paid at checkout. The system 100 may account for the evolving travel industry, and the fact that hotel and rental car vendors often request partial or complete payment in advance of travel. It may also recognize that acceptable methods of payment vary by vendor, although electronic payment by credit card is common. The credit card is, for example, a personal credit card owned by the traveler or a corporate credit card. The corporate credit cards may be, for example, either issued to the traveler or centrally paid by the company (i.e., "ghost cards"). With centrally-billed cards, many travelers use the same credit card to pay for multiple travel events. Those skilled in the art will recognize that there are other methods of payment that could be used.

After paying for one or more of the travel events, the traveler may submit an expense report. Expense reports may serve multiple purposes, comprising, but not limited to: allowing the employee to be reimbursed for approved out-of-pocket expenses incurred during business travel, allowing the company to track the consumption of travel event requests that were previously reserved in order to estimate expenses that will be submitted in the future; or allowing the company to track travel event requests not reserved through the corporate travel management system, or any combination thereof.

Companies often have contracts with specific travel vendors and/or agencies, and these contracts often have minimum purchase requirements that must be met in order for the company to receive the preferred rates specified in the contracts. In addition, on-line self-booking travel tools may enforce travel policies automatically, helping companies control costs. Travelers who do not use these tools are not subject to this policy enforcement, so companies have an interest in identifying these travelers. Expense management tools often comprise the capability of automatically paying credit card bills for company-issued credit cards. Travelers are also often liable for expenses charged to these company-issued credit cards that are not approved by management. Thus, travelers often comprise expenses from company-issued credit cards on their expense reports to obtain the required approval and to automate payment. As payment for different travel events on the same travel request may occur at different times, it is entirely possible that multiple expense reports may be submitted for the same travel request.

In one embodiment, the management system 200 may receive all the travel and expense data and send it to the client. The client may import the data to create an expense report, then submit the expense report and the imported travel and expense data may be linked to the expense item. In another embodiment, the traveler may import unmatched travel data, import expense data, and match the imported expense data to an item on an "in-progress" report. The traveler may then submit an expense report with the data matched.

In a further embodiment, a traveler may import unmatched travel data, submit the expense report, and then later import expense data which either the client or server determines matches already submitted travel expense item. That expense data may then be linked to the already submitted expense item or may give the traveler the option to import that separately in which case it could be flagged optionally to the manager as a possible duplicate expense.

In an additional embodiment, the traveler may import unmatched expense data, and then import travel data and match that data to an item on an in-progress report. The traveler may then submit an expense report with the data matched.

In another embodiment, the traveler may import unmatched expense data, submit the expense report, then later import travel data that either the client or server determines matches an already submitted expense item matched to the expense data. The new travel request data may be either linked to the old report, or the traveler may have the option to import the travel request separately, in which case the request may be flagged optionally to the manager as a possible duplicate expense.

In a further embodiment, the traveler may manually enter an expense item and then the system may import travel and/or expense data and matches that imported data to the manually entered expense, whether that expense is on an in-progress report or a previously submitted report.

Once the expense report is submitted, expense management steps may be performed, such as approving the report (although this could be skipped if, for example, the expenses may be mapped to travel requests that have been approved prior to travel). The system may pay expenses, reimburse the traveler, and pay the corporate card vendor. Expenses may also be exported to accounting systems. Reporting may also be performed with reconciliation reports that show travel requests not expensed or expense items not requested through the travel system, and travel data and credit card data may be accessed for a transaction because that data is linked to the expense items.

It should be noted that, in one embodiment, one or more new expense reports may be automatically generated for travel items received by this invention and passed to the expense system. For example, expense reports could be automatically generated on a periodic basis from travel data items because a certain entity had many employees without Internet access.

Besides expensing of travel items, another use of the travel items may be to handle location and alerting of travel employees based on an estimation that a traveler may be in or near a particular location. As one example, after the earthquake and tsunami in Japan in the spring of 2011, a company might wish to, or be obligated to, identify any of their employees currently in, traveling to or from, or through Japan or any of the regions affected by the earthquake, or may have been in any of those situations recently or will be in the future. Identifying and messaging any such employees would allow a company to determine whether any affected employees are in the affected area and to determine their current health and welfare, or to alert travelers who were either traveling to or through Japan to determine whether their plans changed and they are currently in the affected area, or to warn them to either cancel or reroute their future travel plans to avoid visiting or transiting through the affected areas.

In one embodiment, all travel itineraries may be searchable as one source of possible candidate locations for a user to be in based on the itinerary information stored.

In one embodiment, the itinerary information for a user may be used as the basis to develop future recommendations for travel booking choices based on that user's prior booking behavior, as well source data for generating customer preference profile data and for aggregating travel booking preferences to generate an automated recommendation system using statistical analysis of user similarities of profile preference data and for all users of the system.

In one embodiment, the customer preference profile data for a specific user may also be provided to a travel supplier as the basis for them to make tailored offers for additional travel booking items to be presented either as offers in an integrated itinerary display or as part of an online search for new bookings or additions to existing itineraries within this invention.

In one embodiment, the itinerary data collected for a user, and for all users within a company, may be made available to a reporting system that may generate standard and customized travel reports presenting data at the user-level, sub-company-level, or company-level across all sources of received itineraries to present a unified view of travel booking information organized across, for example, travel inventory types such as air or hotel, by dates, by policy compliance, booking source, vendor, geographic location or route.

In some embodiments, this method may work for users or entities without TMCs by relying strictly on email and supplier-posted PNRs. For example, in some embodiments, much of the content may be outside the reservation system. The travelers often access this content directly, so it is difficult to manage. Thus, rather than building connections to every single supplier, suppliers may be integrated only via forwarding emails or posting itineraries.

Additional information on expense management may be found in, for example, the following: U.S. patent application Ser. No. 11/159,398, filed on Jun. 23, 2005; U.S. patent application Ser. No. 10/373,096, filed on Feb. 26, 2003; and U.S. patent application Ser. No. 11/763,562, filed on Jun. 15, 2007. Any of the other patents/applications may also be referenced.

While various embodiments have been described above, it should be understood that they have been presented by way of example and not limitation. It will be apparent to persons skilled in the relevant art(s) that various changes in form and detail may be made therein without departing from the spirit and scope. In fact, after reading the above description, it will be apparent to one skilled in the relevant art(s) how to implement alternative embodiments. Thus, the present embodiments should not be limited by any of the above-described embodiments.

In addition, it should be understood that any figures which highlight the functionality and advantages are presented for example purposes only. The disclosed methodology and system are each sufficiently flexible and configurable such that they may be utilized in ways other than that shown.

Further, the purpose of any Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. An Abstract of the Disclosure is not intended to be limiting as to the scope of the present invention in any way.

Although the term "at least one" may often be used in the specification, claims and drawings, the terms "a", "an", "the", "said", etc. also signify "at least one" or "the at least one" in the specification, claims and drawings.

Additionally, the term "comprising" or similar terms in the specification, claims and drawings should be interpreted as meaning "including, but not limited to."

Finally, it is the applicant's intent that only claims that include the express language "means for" or "step for" be interpreted under 35 U.S.C. 212, paragraph 6. Claims that do not expressly include the phrase "means for" or "step for" are not to be interpreted under 35 U.S.C. 212, paragraph 6.

What is claimed is:

1. A method comprising:
    performing processing associated with receiving, with an identity assignment module in communication with a computer comprising a database, a first reservation from a first source and at least one second reservation from at least one second source, the at least one second reservation comprising: at least one new reservation with respect to the first reservation, at least one change to the first reservation, or at least one replacement of the first reservation;
    performing processing associated with identifying, with the identity assignment module, a traveler associated with the first reservation;
    performing processing associated with adding, with the identity assignment module, information about the identified traveler from the first reservation to an itinerary record in the database;
    performing processing associated with retrieving, with a merge and de-duplication module in communication with the computer, the itinerary record associated with the first reservation of the identified traveler from the database;
    performing processing associated with determining, with the merge and de-duplication module, whether information from the at least one second reservation will replace information from the first reservation;
    performing processing associated with combining, with the merge and de-duplication module, information from the first reservation and information from the at least one second reservation when it cannot be determined whether the information from the at least one second reservation will replace the information from the first reservation;
    performing processing associated with storing, with the merge and de-duplication module, an updated itinerary record in the database, the updated itinerary record being updated based on replacement information and/or combined information,
    performing processing associated with retrieving, with a policy enforcement module in communication with the computer, the updated itinerary record from the database;
    performing processing associated with evaluating, with the policy enforcement module, the updated itinerary record to determine whether it is in compliance with a policy;
    performing processing associated with adding, with the policy enforcement module, non-compliance data to an evaluated itinerary record when the evaluated itinerary record is not in compliance with the policy so that the evaluated itinerary record is marked non-compliant;
    performing processing associated with sending, with an itinerary management interface module in communication with the computer, at least some information from the non-compliant itinerary record to a display when the evaluated itinerary record is not in compliance with the policy; and
    performing processing associated with storing, with the itinerary management interface module, information from the non-compliant itinerary record in the database when the evaluated itinerary record is not in compliance with the policy.

2. The method of claim 1, further comprising:
    performing processing associated with identifying, with the identity assignment module, a company associated with the itinerary record; and
    performing processing associated with adding, with the identity assignment module, information about the identified company to the itinerary record.

3. The method of claim 1, further comprising performing processing associated with storing, with the identity assignment module, the itinerary record in the database.

4. The method of claim 1, further comprising:
    performing processing associated with receiving, with an itinerary parser module in communication with the computer, an email associated with an itinerary;
    performing processing associated with parsing, with the itinerary parser module, the email into structured data;
    performing processing associated with adding, with the itinerary parser module, related data to the structured data to create the itinerary record; and
    performing processing associated with sending, with the itinerary parser module, the itinerary record to the identity assignment module.

5. The method of claim 1, further comprising performing processing associated with adding, with the policy enforcement module, compliance information to the evaluated itinerary record when the evaluated itinerary record is in compliance with the policy.

6. The method of claim 1, further comprising:
    performing processing associated with receiving, with the itinerary management interface module, a command in response to the sending of the non-compliant itinerary record to the display when the evaluated itinerary record is not in compliance with the policy;
    performing processing associated with marking, with the policy enforcement module, the evaluated itinerary record as allowed or requiring a change.

7. The method of claim 1, wherein the first source and the at least one second source comprise at least two of the following: a supplier direct connection, an online booking tool, an email from a user, or a travel agent, or any combination thereof.

8. The method of claim 1, wherein expenses related to an itinerary may be incorporated into an expense report and/or a location of a user may be determined.

9. A system comprising:
    a processor configured for:
    performing processing associated with receiving, with an identity assignment module in communication with a computer comprising a database, a first reservation from a first source and at least one second reservation from at least one second source, the at least one second reservation comprising: at least one new reservation with respect to the first reservation, at least one change to the first reservation, or at least one replacement of the first reservation;
    performing processing associated with identifying, with the identity module, a traveler associated with the first reservation;
    performing processing associated with adding, with the identity assignment module, information about the identified traveler from the first reservation to an itinerary record in the database;
    performing processing associated with retrieving, with a merge and de-duplication module in communication with the computer, the itinerary record associated with the first reservation of the identified traveler from the database;

performing processing associated with determining, with the merge and de-duplication module, whether information from the at least one second reservation will replace information from the first reservation;

performing processing associated with combining, with the merge and de-duplication module, information from the first reservation and information from the at least one second reservation when it cannot be determined whether the information from the at least one second reservation will replace the information from the first reservation;

performing processing associated with storing, with the merge and de-duplication module, an updated itinerary record in the database, the updated itinerary record being updated based on replacement information and/or combined information;

performing processing associated with retrieving, with a policy enforcement module in communication with the computer, the updated itinerary record from the database;

performing processing associated with evaluating, with the policy enforcement module, the updated itinerary record to determine whether it is in compliance with a policy;

performing processing associated with adding, with the policy enforcement module, non-compliance data to an evaluated itinerary record when the evaluated itinerary record is not in compliance with the policy so that the evaluated itinerary record is marked non-compliant;

performing processing associated with sending, with an itinerary management interface module in communication with the computer, at least some information from the non-compliant itinerary record to a display when the evaluated itinerary record is not in compliance with the policy; and performing processing associated with storing, with the itinerary management interface module, information from the non-compliant itinerary record in the database when the evaluated itinerary record is not in compliance with the policy.

10. The system of claim 9, wherein the processor is further configured for:

performing processing associated with identifying, with the identity assignment module, a company associated with the itinerary record; and performing processing associated with adding, with the identity assignment module, information about the identified company to the itinerary record.

11. The system of claim 9, wherein the processor is further configured for performing processing associated with storing, with the identity assignment module, the itinerary record in the database.

12. The system of claim 9, wherein the processor is further configured for:

performing processing associated with receiving, with an itinerary parser module in communication with the computer, an email associated with an itinerary;

performing processing associated with parsing, with the itinerary parser module, the email into structured data;

performing processing associated with adding, with the itinerary parser module, related data to the structured data to create an itinerary record; and performing processing associated with sending, with the itinerary parser module, the itinerary record to the identity assignment module.

13. The system of claim 9, wherein the processor is further configured for performing processing associated with adding, with the policy enforcement module, compliance information to the evaluated itinerary record when the evaluated itinerary record is in compliance with the policy.

14. The system of claim 9, wherein the processor is further configured for:

performing processing associated with receiving, with the itinerary management interface module, a command in response to the sending of the non-compliant itinerary record to the display when the evaluated itinerary record is not in compliance with the policy;

performing processing associated with marking, with the policy enforcement module, the evaluated itinerary record as allowed or requiring a change.

15. The system of claim 9, wherein the first source and the at least one second source comprise at least two of the following: a supplier direct connection, an online booking tool, an email from a user, or a travel agent, or any combination thereof.

16. The system of claim 9, wherein expenses related to an itinerary may be incorporated into an expense report and/or a location of a user may be determined.

* * * * *